United States Patent [19]

Langewellpott

[11] Patent Number: 4,587,662
[45] Date of Patent: May 6, 1986

[54] TDMA SPREAD-SPECTRUM RECEIVER WITH COHERENT DETECTION

[75] Inventor: Ulrich Langewellpott, Esslingen, Fed. Rep. of Germany

[73] Assignee: International Standard Electric Corporation, New York, N.Y.

[21] Appl. No.: 573,785

[22] Filed: Jan. 25, 1984

[30] Foreign Application Priority Data

Jan. 28, 1983 [DE] Fed. Rep. of Germany ....... 3302828

[51] Int. Cl.⁴ .......................................... H04B 15/00
[52] U.S. Cl. ......................................... 375/1; 375/96; 455/303; 455/65; 343/5 PN; 367/40
[58] Field of Search ................. 343/5 PN; 367/40; 375/1, 38, 40, 96, 100; 370/93; 455/65, 303

[56] References Cited

U.S. PATENT DOCUMENTS

| | | | |
|---|---|---|---|
| 3,614,623 | 10/1971 | McAuliffe | 375/96 |
| 4,007,330 | 2/1977 | Winters | 375/96 |
| 4,203,071 | 5/1980 | Bowles et al. | 375/1 |
| 4,550,414 | 10/1985 | Guinon et al. | 375/1 |

Primary Examiner—Marc E. Bookbinder
Assistant Examiner—Raymond C. Glenny
Attorney, Agent, or Firm—John T. O'Halloran; Thomas F. Meagher

[57] ABSTRACT

To utilize indirect-path signals in a receiver for fixed and mobile transmitter-receiver stations of a TDMA spread-spectrum digital radio system, coherent detection is employed. At the same time, the signal imaging the multipath profile is continuously regenerated by a regeneration circuit. The regeneration circuit provides a phase-coherent signal employed for demodulating the received signal.

8 Claims, 4 Drawing Figures

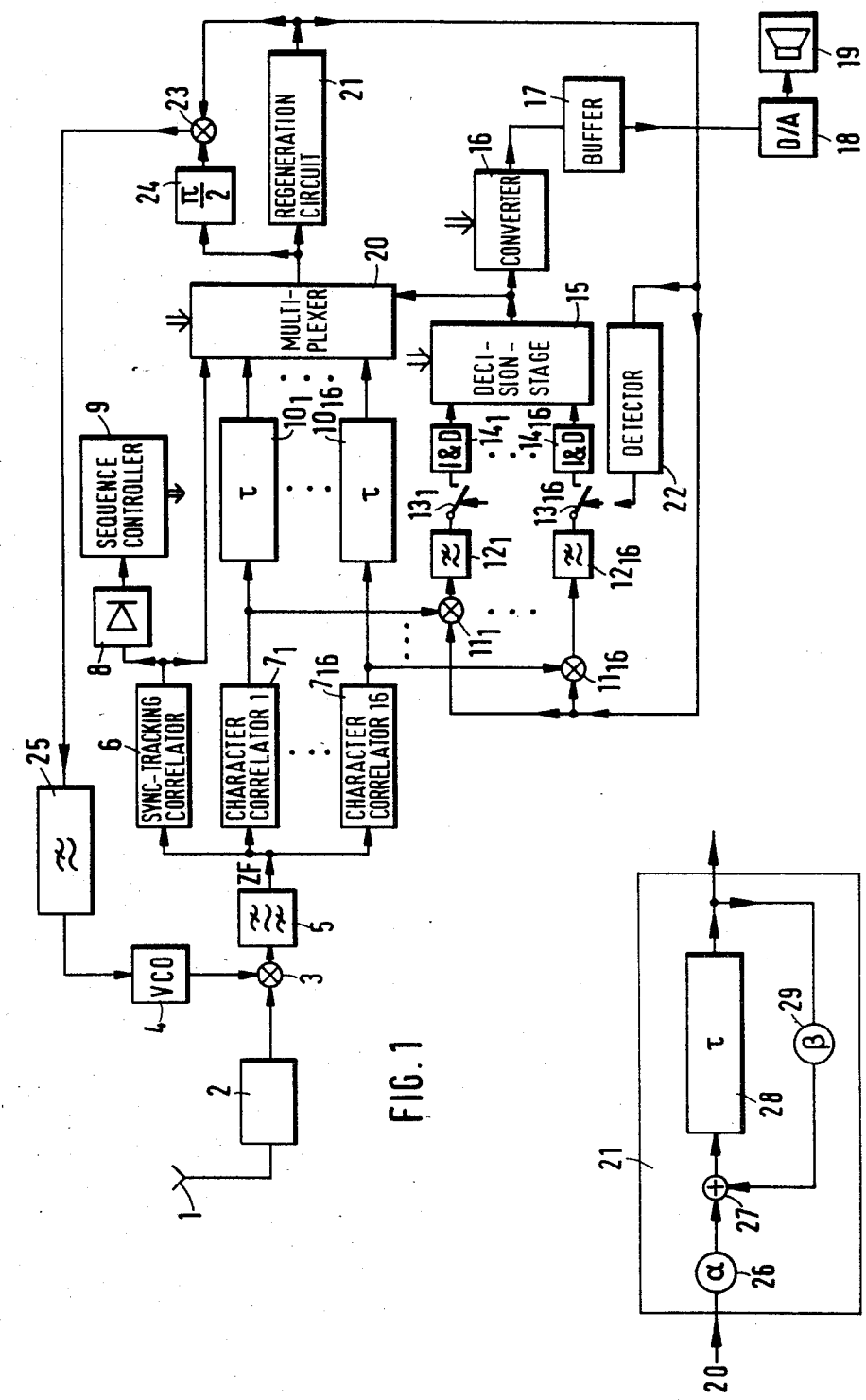

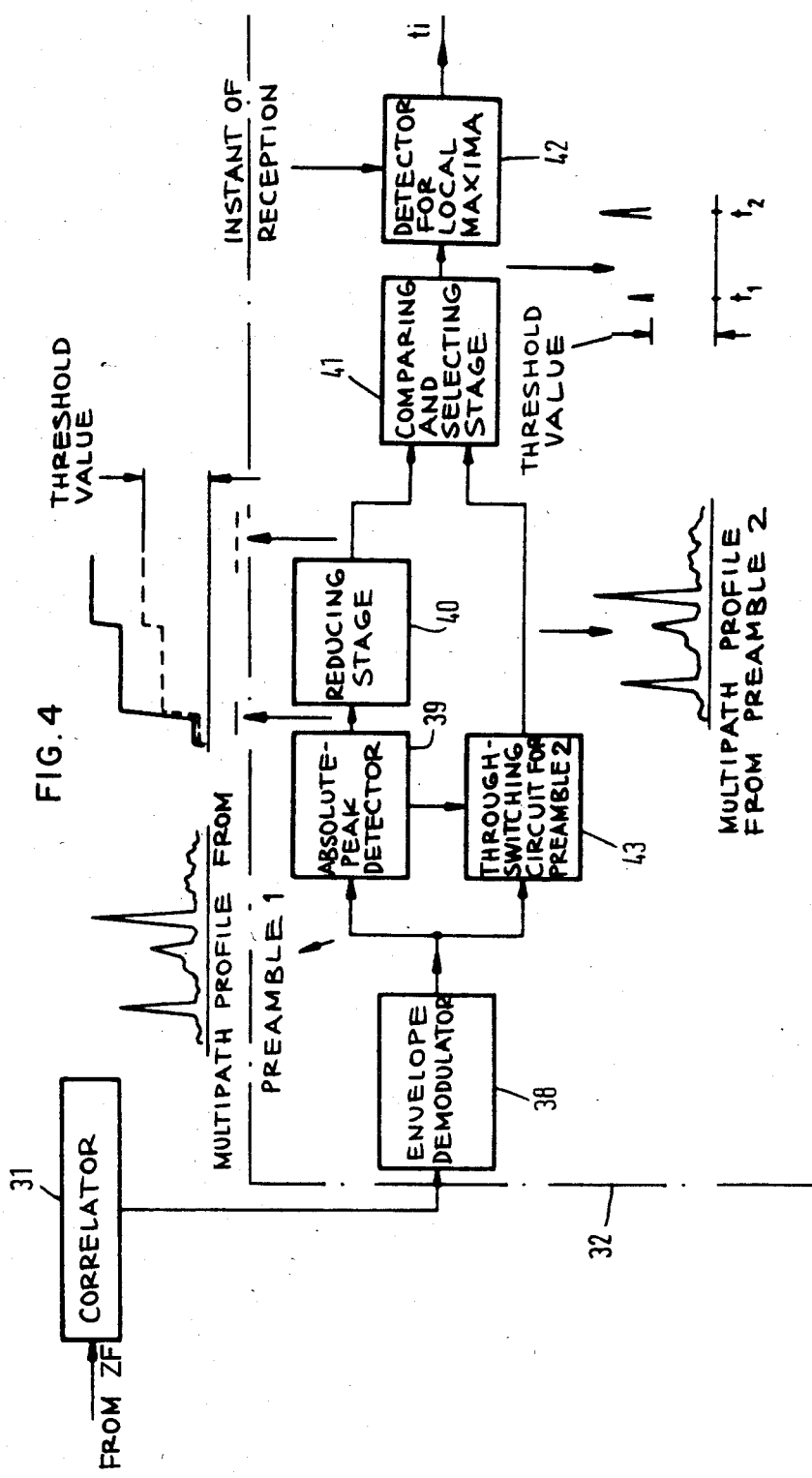

TDMA SPREAD-SPECTRUM RECEIVER WITH COHERENT DETECTION

The present invention relates to a receiver as set forth in the preamble of claim 1.

U.S. patent application Ser. No. 728,143, "Communication System", filed Apr. 26, 1985, of K. D. Eckert et al., assigned to International Standard Electric Corporation, which is a continuation of Ser. No. 374,471, filed May 3, 1982 (now abandoned), discloses a communication system comprising fixed and mobile transmitter-receiver stations which operates in a time division multiple access mode and uses the spread-spectrum technique. To recover the transmitted message, correlators and envelope detectors are employed.

There indirect-path signals of sufficient strength are correlated; the results are sampled at appropriate instants, and the sample values are integrated.

The object of the invention is to provide a receiver of the above kind which permits coherent detection of the received signals.

This object is attained by the means set forth in claim 1. Further advantageous features are claimed in the subclaims.

Through the invention, coherent detection of indirect-path signals with different transit times, amplitudes, and zero phase angles is possible, so that such signals can be accounted for as well. This gives a considerable improvement in transmission performance, particularly in the presence of critical multipath profiles, and improves the rejection of interfering signals from neighboring cells. It is now also possible to use biorthogonal m-element code characters and thus increase frequency economy.

An embodiment of the invention will now be explained in more detail with reference to the accompanying drawing, in which:

FIG. 1 is a block diagram of a receiver, and

FIG. 2 is a block diagram of a regeneration circuit of the receiver.

FIGS. 3 and 4 are block diagrams of circuits for correlation peak detection.

Figure 3:
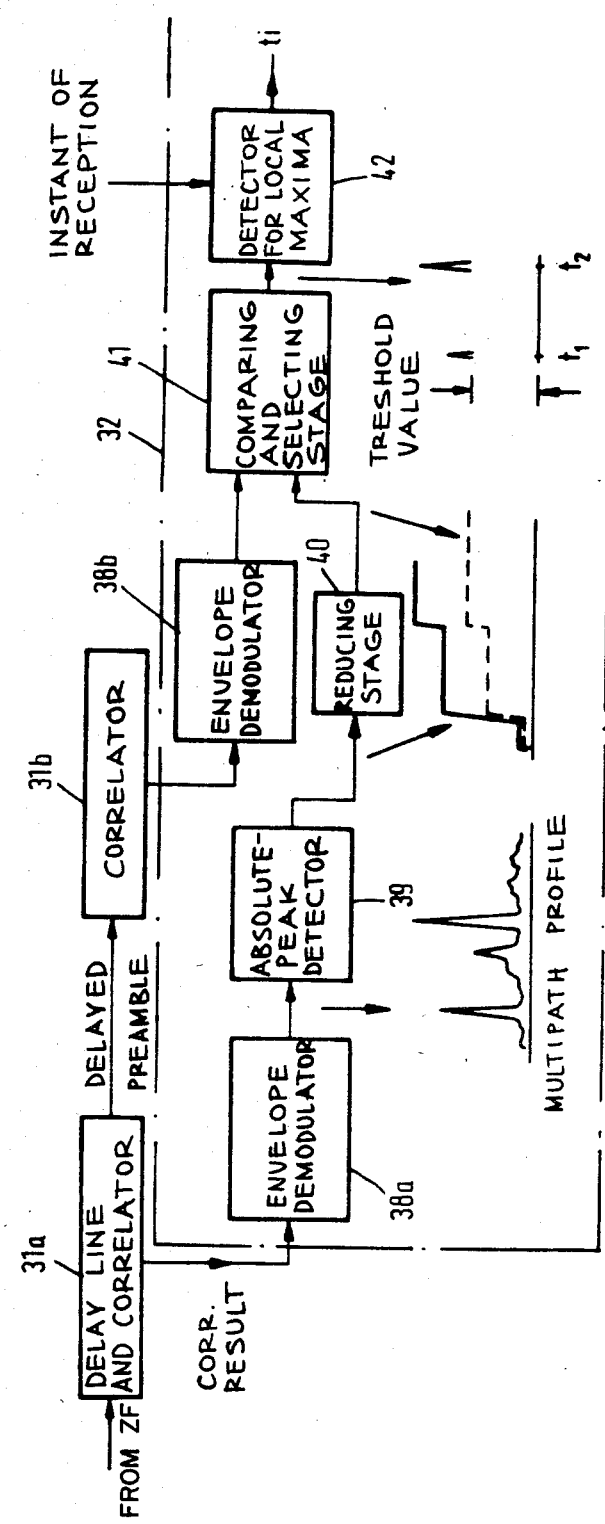

The receiver shown in FIG. 1 is designed for the transmitter-receiver stations of a digital radio system employing time division multiple accessing and the spread-spectrum technique. Every n bits to be transmitted are combined in an n-bit group and then encoded by code characters of an m-element alphabet. The characters thus formed are transmitted and must be reconverted into the n bits in the receiver. In the example described in the following, n=4 and m=16. In the radio system, a plurality of fixed transmitter-receiver stations may be controlled from a control station, and a plurality of such control stations may be connected to an interface facility providing the connection to a dial-telephone network. Each control station controls the fixed transmitter-receiver stations of one cell.

FIG. 1 shows only the receiver of a transmitter-receiver station; all parts not directly belonging to the receiver have been omitted.

An antenna 1 is connected to an RF stage 2, whose output is coupled to one input of a mixer 3 for producing an IF signal ZF. The other input of the mixer 3 is connected to a voltage-controlled oscillator (VCO) used as a local oscillator. The resulting IF signal passes through a band-pass filter 5 and is applied to a sync-tracking correlator 6 and to m=16 character correlators $7_1$ to $7_{16}$. The sync-tracking correlator 6 is followed by an envelope demodulator 8 having its output connected to a sequence controller 9.

The sync-tracking correlator 6 serves to synchronize the time slots and is employed for the sequence controller 9. Character correlator $7_1$–$7_{16}$ compare the receive signal with the 16 code words of the 16 element alphabet. The operation of correlator 6 and controller 9, with demodulator 8 for each shown in the aforementioned Eckert application, which is as follows:

FIG. 3 shows a block diagram of a circuit for detecting all correlation peaks of the synchronization preamble. The synchronization preamble is applied from the receiver 2 to two series-connected correlators $31a$ and $31b$ for synchronization. The first correlator $31a$ also serves as a delay line for the second correlator $31b$, and both are connected to the sequencer 12 (shown partly). The result of the first correlator $31a$ is fed to an envelope demodulator $38a$, which is followed by a peak detector 39 and a reducing stage 40. The result of the second correlator $31b$ is fed to an envelope demodulator $38b$. The outputs of the envelope demodulators are connected to a comparing and selecting stage 41, which is followed by another peak detector 42. The times of arrival $t_i$ of relevant indirect-path signals, also referred to as "paths", can be taken off the output of the peak detector 42 and are available for the reception of the characters.

The multipath profile thus obtained is imaged in the waveform of the output voltage of the synchronization correlator. The delay of the correlator $31a$ must be chosen to be so large that the correlation result of the strongest path is present when the output signals of the correlator $31b$ are applied to the comparing and selecting stage 41 for comparison. From the correlation result of the strongest path, a threshold value for the comparing and selecting stage 41 is derived. The threshold value serves to suppress correlation peaks lying in or slightly above the noise.

The peak detector 39 detects the absolute maximum of the correlation peaks, while the peak detector 42, which is also fed with the instant of reception, determines the times of arrival of the peaks exceeding the threshold value.

The reducing stage 40 derives from the level of the strongest path the threshold value with which the multipath profile is compared in the comparing and selecting stage 41.

If the synchronization preamble is transmitted twice with an intervening and a subsequent pause, a simpler circuit can be used to detect all correlation peaks. This circuit is shown in FIG. 4.

The correlator 31 is connected to the receiver 2 and has its output coupled to the sequencer 12 (shown partly). The latter includes an envelope demodulator 38, which is followed by an absolute-peak detector 39, a reducing stage 40, a comparing and selecting stage 41, and a peak detector 42 for detecting local maxima. The output of the peak detector 42 again provides the times of arrival $t_i$ of the relevant paths. Connected to the envelope demodulator 38 is a circuit 43 which is controlled by the peak detector 39 and serves to switch the second synchronization preamble through to the comparing and selecting stage 41.

With the aid of the first synchronization preamble, the absolute maximum of the multipath profile and the threshold value are determined. The times of arrival of the relevant paths are then determined from the correlation of the second synchronization preamble. As the correlator and the envelope demodulator are used twice in succession, the amount of circuitry required is smaller than in the circuit of FIG. 3. The evaluation times needed are equal in both circuits.

Each of the m=16 character correlators $7_1$ to $7_{16}$ is followed by a delay element 10, e.g., a delay line, and a mixer 11. The mixers $11_1$ to $11_{16}$ are fed with a signal wave from the regeneration circuit 21, which will be explained later. Each of the mixers 11 is followed by a low-pass filter 12, a sampling switch 13, and a cyclically reset integrator 14 in series. All integrators $14_1$ to $14_6$ are connected to a decision stage 15, which is clocked by the sequence controller.

The output of the decision stage 15 is connected to a converter 16, which produces 4-bit groups under control of the sequence controller 9. The converter 16 is followed by a buffer 17. For digital speech communication, this buffer has its output connected to a digital-to-analog converter 18 in series with a telephone receiver or loudspeaker 19 in the case of a mobile transmitter-receiver station, and to a corresponding processing unit (not shown) in the case of a fixed transmitter-receiver station.

The delay elements $10_1$ to $10_{16}$ are followed by a multiplexer 20, which is also fed with the output signal of the sync-tracking correlator 6, and which is controlled by the decision stage 15 and clocked by the sequence controller 9. The multiplexer 20 is followed by the regeneration circuit 21, whose output is connected to the mixers $11_1$ to $11_{16}$, a detector 22 for controlling the sampling switches $13_1$ to $13_{16}$, and a phase comparator 23. The second input of the comparator 23 is connected to the output of the multiplexer 20 via a 90° phase shifter 24. The output of the comparator 23 is coupled to the control input of the local oscillator 4 through a low-pass filter 25.

The signal received by the antenna 1 is processed, e.g., filtered and amplified, in the RF stage 2 and then applied to the mixer 3, where it is down-converted to the IF signal. The band-pass filter 5 eliminates undesired sidebands and interference signals, and the IF signal is then applied to the sync-tracking correlator 6 and the character correlators $7_1$ to $7_{16}$. The sync-tracking correlator serves to synchronize the receiver with the received time slots and receives a sync code word from a code generator (not shown). On the basis of the autocorrelation function, the envelope demodulator 8 provides a signal to the sequence controller 9, which clocks the decision stage 15, the multiplexer 20, and the converter 16 in the proper manner. The amplitude- and phase-modulated output wave of the sync-tracking correlator 6 images the multipath profile, i.e., according to the received indirect-path signals, correlations peaks are formed whose time sequence represent the profile. From this profile, a phase-coherent signal is derived for demodulating the received signal. To this end, the profile is transferred to the multiplexer 20, which feeds it into the regeneration circuit 21. The latter contains a recirculating delay line giving a delay $\tau$ equal to the duration of one character. As a result, a signal wave with the multipath profile is available at the output of the regeneration circuit in a periodic sequence.

Each of the character correlators $7_1$ to $7_{16}$ is fed with one of the sixteen code words from the code generator and compares the received IF signal with this code word. The output signals of the character correlators are mixed with the signal wave from the regeneration circuit 21 in the mixers $11_1$ to $11_{16}$ in phase-coherent fashion. The signals thus obtained pass through the low-pass filters $12_1$ to $12_{16}$ and are then sampled by the sampling switches $13_1$ to $13_{16}$. The detector 22 determines the sampling instants from the signal wave from the regeneration circuit by responding to the maxima of this signal wave. The sampled signals are fed to the integrators $14_1$ to $14_{16}$, where they are added up. At the end of each character interval, the decision stage 15 interrogates the integrators for integrated signals under the control of the sequence controller 9, and the integrators are then reset to zero. From the integrated signals, the decision stage 15 selects the one with the largest amplitude and defines the code word assigned to the corresponding character correlator as the character transmitted with the highest probability.

The following converter 16 forms from this code character the associated 4-bit group, which is then buffered.

The subsequent processing depends on whether the receiver is in a mobile transmitter-receiver station or a fixed transmitter-receiver station. In a mobile station, the buffered 4-bit groups are converted from digital to analog form and reproduced in the telephone receiver 19. In a fixed station, they are transferred to a processing unit which passes them on to the control station.

The selection of a character correlator $7_1$ to $7_{16}$ by the decision stage 15 is communicated to the multiplexer, which then connects the output of the associated delay element $10_1$ to $10_{16}$ to the regeneration circuit 21. The latter thus adapts the multipath profile contained in it to the multipath profile just received, so that the signal wave has the amplitudes, zero phase angles, and transit times of the signals of the individual propagation paths. This signal wave is applied to the mixers $11_1$ to $11_{16}$, so that coherent mixing takes place. At the same time, the detector 22 is fed with this signal wave, so that it can control the sampling switches $13_1$ to $13_{16}$ accordingly.

Due to varying ambient temperatures, the frequency of the local oscillator 4 may drift and thus cause phase shifts. For the same reason, changes in propagation delay may occur which cause phase shifts, too. To counteract this, the signal wave at the output of the regeneration circuit 21 is compared in the comparator 23 with the signal transferred by the multiplexer 20 and shifted in phase by $\pi/2$.

The resulting control signal controls the local oscillator 4 via the low-pass filter 25. Care should be taken to ensure that the local oscillator 4 is adjusted slowly because the delay elements $10_1$ to $10_{16}$ in this control circuit represent dead-time elements.

At the beginning of each time slot, the multiplexer 20 transfers the signal from the sync-tracking correlator 6, which images the multipath profile as an amplitude- and phase-modulated wave, to the regeneration circuit 21, where it is stored. The synchronization preamble is followed by a sequence of known characters, called "training sequence", which, since the corresponding character correlators are known, provide an amplitude- and phase-modulated wave as an exact image of the multipath profile. These signals, too, are fed through the multiplexer 20 to the regeneration circuit 21, which adds them to the signal stored in it. A phase-coherent signal is then available at the output for demodulation, which is continuously adapted to the current multipath profile as described above.

FIG. 2 shows a block diagram of the regeneration circuit 21. The input is connected to a delay line 28 via an attenuator 26 having the factor $\alpha$ and followed by a summer 27. The delay $\tau$ is equal to the duration of one character. The output is connected to the summer 27 via an additional attenuator 29 having the factor $\beta = 1 - \alpha$.

At the beginning of each time slot, the signal from the sync-tracking correlator 6 is fed, via multiplexer 20 as seen in FIG. 1, into the delay line 28 unattenuated, i.e., the factor $\alpha$ is equal to one. The signals from the character correlators evaluating the following training sequence are entered, via multiplexer 20 as seen in FIG. 1, unattenuated, too, so that the regenerating process can start in optimum fashion, because no decision errors can occur. Then, the factor $\alpha$ is set at the value 0.1, for example, so that the factor $\beta$ of the attenuator 29 is 0.9. This means that 90% of the stored signal is fed back to the input of the delay line 28, and only 10% of a signal applied to the input of the regeneration circuit 21 are added. Thus, the signals then provided by the character correlators distort the signal of the regeneration circuit only negligibly if they are erroneous, but improve the signal of the regeneration circuit if they are error-free, because a coherent addition of the useful-signal component takes place, while interference signals combine incoherently. This means that the signal to be demodulated is continuously adapted to the actual multipath profile during the time slot, and that a high degree of rejection of unwanted signals is achieved.

As the delay provided by the delay line 28 is equal to the duration of one character, the signal of the multipath profile is available at the output of the regeneration circuit 21 in a periodic sequence and can be used for coherent detection of the signals from the character correlators.

The use of biorthogonal m-element code characters to spread the n-bit groups means that each character can also be transmitted in inverted form. In the decision stage 15, the largest integration result must then be found, whose sign must be evaluated. The multiplexer 20 must then permit a sign reversal.

I claim:

1. Receiver comprising a demodulator which is fed with an IF signal and contains a sync-tracking correlator connected to a sequence controller, and contains m character correlators connected to m character detectors and a decision stage, for fixed and mobile transmitter-receiver stations of a digital radio system employing time division multiple accessing and the spread-spectrum technique, wherein evey n bits to be transmitted are combined to form an n-bit group and encoded by a code character of an m-element alphabet, characterized in that each of the character detectors contains a mixer ($11_1$–$11_{16}$) connected to a low-pass-filter ($12_1$–$12_{16}$), a sampling switch ($13_1$–$13_{16}$), and a cyclically reset integrator ($14_1$–$14_{16}$), and that each of the character correlators ($7_1$–$7_{16}$) has its output connected to a delay line ($10_1$–$10_{16}$) connected to a multiplexer (20) which has one of its inputs connected to the output of the sync-tracking correlator (6), is influenced by the output signal of a decision stage (15), and is connected to a regeneration circuit (21) which has its output connected to a detector (22) controlling the sampling switches ($13_1$–$13_{16}$) and to the mixers ($11_1$–$11_{16}$) and applies to the latter a signal having a waveform suitable for phase-coherent mixing.

2. A receiver as claimed in claim 1, characterized in that the regeneration circuit (21) consists of a delay line (28) having its output connected through a first attenuator (29) to a summer (27) whose output is connected to the input of the delay line (28) and whose input is connected to the input of the regeneration circuit through a second attenuator (26).

3. A receiver as claimed in claim 2, characterized in that the delay provided by the delay line (28) is equal to the duration of one character.

4. A receiver as claimed in claim 2, characterized in that the second attenuator (16) provides an attentuation by a factor $\alpha$ smaller than one, and the first attenuator (29) an attenuation by the factor $\beta = 1 - \alpha$.

5. A receiver as claimed in claim 4, characterized in that the factors of the attenuators are adjustable.

6. A receiver as claimed in claim 5, characterized in that the factor $\alpha$ of the second attenuator (26) is set at one at the beginning of each time slot for the duration of a synchronization preamble and a following sequence of a few known characters used as a training sequence.

7. A receiver as claimed in claim 1, characterized in that the output of the multiplexer (20) and the output of the regeneration circuit (21) are connected via a 90° phase shifter (24) and directly, respectively, to a phase comparator (23) having its output connected through a low-pass filter (25) to the control output of a voltage-controlled oscillator used as a local oscillator (4) which feeds a mixer (3) for producing the IF signal.

8. A receiver as claimed in claim 1, characterized that use is also made of biorthogonal m-element code characters, and that a sign reversal can then be effected in the multiplexer (20).

* * * * *